United States Patent
Lucey et al.

(10) Patent No.: US 9,342,785 B2
(45) Date of Patent: May 17, 2016

(54) TRACKING PLAYER ROLE USING NON-RIGID FORMATION PRIORS

(71) Applicant: Disney Enterprises, Inc., Burbank, CA (US)

(72) Inventors: Patrick Lucey, Pittsburgh, PA (US); Alina Bialkowski, Sinnamon Park (AU); G. Peter Carr, Pittsburgh, PA (US); Iain Matthews, Pittsburgh, PA (US); Yaser Sheikh, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 364 days.

(21) Appl. No.: 14/081,454

(22) Filed: Nov. 15, 2013

(65) Prior Publication Data

US 2015/0142716 A1    May 21, 2015

(51) Int. Cl.
    *G06K 9/00* (2006.01)
    *G06N 5/02* (2006.01)
(52) U.S. Cl.
    CPC ............ *G06N 5/022* (2013.01); *G06K 9/00624* (2013.01); *G06K 9/00724* (2013.01)
(58) Field of Classification Search
    CPC .......... G06K 9/00624; G06K 9/00718; G06K 9/00724; G06T 2207/30221; G06T 2207/30228; G06N 5/02; G06N 5/022
    See application file for complete search history.

(56) References Cited

U.S. PATENT DOCUMENTS

| | | | |
|---|---|---|---|
| 6,710,713 B1* | 3/2004 | Russo | 340/573.1 |
| 2003/0048849 A1* | 3/2003 | Tomita, Jr. et al. | 375/240.25 |
| 2009/0060321 A1* | 3/2009 | Gillard et al. | 382/154 |
| 2011/0268320 A1* | 11/2011 | Huang et al. | G06K 9/00718 382/103 |
| 2013/0128034 A1* | 5/2013 | Carr | 348/135 |
| 2014/0364976 A1* | 12/2014 | Wohl et al. | A63B 71/0622 700/91 |

* cited by examiner

*Primary Examiner* — Andrew W Johns
(74) *Attorney, Agent, or Firm* — Patterson + Sheridan, LLP

(57) ABSTRACT

Approaches are described for assigning roles to agents in a group of agents engaging in an activity. An assignment analysis system receives a first set of detections, where each detection in the first set of detections comprises a physical location. The assignment analysis system defines an exemplar formation comprising an arrangement of each role in a set of roles. The assignment analysis system calculates a first cost function between at least one detection in the first set of detections and at least one role in the set of roles. The assignment analysis system generates a first set of permutations based on the first cost function. The assignment analysis system assigns a first role in the set of roles to a first detection in the first set of detections based on the first set of permutations.

20 Claims, 9 Drawing Sheets

TRACKING PLAYER ROLE USING NON-RIGID FORMATION PRIORS

BACKGROUND OF THE INVENTION

1. Field of the Invention

The present invention relates to artificial intelligence systems used to analyze participants engaged in an activity and, in particular, to tracking player role using non-rigid formation priors.

2. Description of the Related Art

Vision-based systems have been deployed to detect and track players engaged in adversarial team sports. Such vision-based systems may record the position of each player multiple times per second over the course of play. For example, a vision-based system may generate location data for each player at a rate of thirty times per second. These systems may support applications configured to perform various analysis functions, including, characterizing offensive patterns, recognizing individual plays, and predicting the evolution of play in a game or match. Typically, such systems characterize team behavior using a macroscopic representation of the team, such as the position of the centroid of the team players or the distribution pattern of the team players on the playing field, or analyzing a single player over time. Such representations fail to characterize how individual players or teams perform over time, particularly if the role of one or more players changes as play progresses.

In addition, tracking data for players or teams may exhibit high dimensionality, where the quantity of samples collected over long periods of play may be too numerous for applications to efficiently analyze and produce reasonable results. For example, a given set of tracking data may include 200,000 frames of location data from eight different camera angles. Certain temporal analyses may be computationally prohibitive where the tracking data exhibits high dimensionality. Finally, vision systems often do not provide perfect tracking, resulting in false detections or missed detections. Analysis applications relying on tracking data that includes such false detections or missed detections may produce erroneous results. Alternatively, the tracking data may be manually edited to remove any anomalies associated with false or missed detections. However, manually editing tracking data is tedious and time-consuming.

SUMMARY OF THE INVENTION

One embodiment of the present invention sets forth a method for assigning roles to agents in a first group of agents engaging in an activity. The method includes receiving a first set of detections, wherein each detection in the first set of detections comprises a physical location. The method further includes defining an exemplar formation comprising an arrangement of each role in a set of roles. The method further includes calculating a first cost function between at least one detection in the first set of detections and at least one role in the set of roles. The method further includes generating a first set of permutations based on the first cost function. The method further includes assigning a first role in the set of roles to a first detection in the first set of detections based on the first set of permutations.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a computing system configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
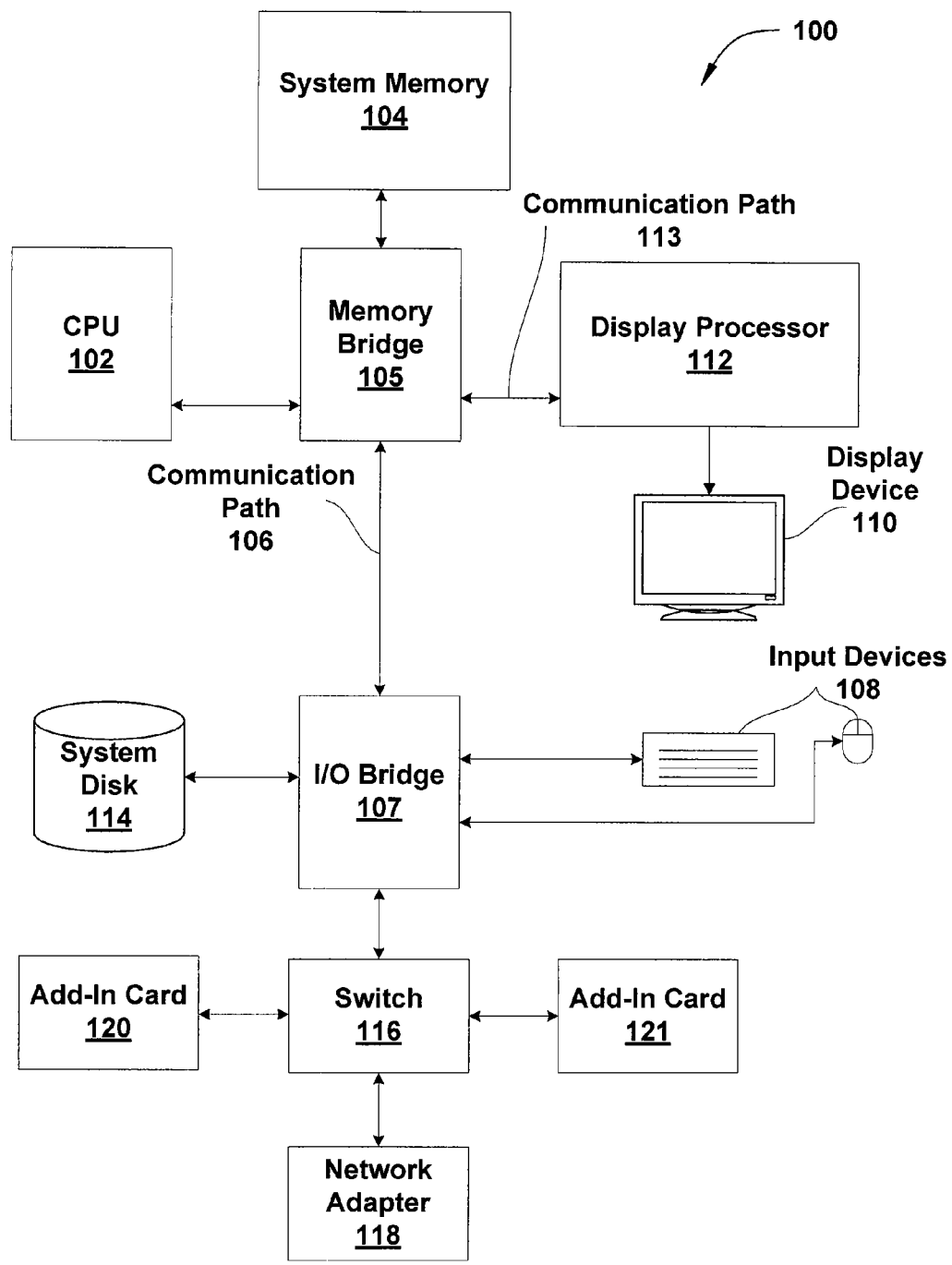
FIG. 1 depicts one architecture of a system within which embodiments of the present invention may be implemented.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. Such computer, other programmable apparatus or other device may include, without limitation, a personal computer, video game console, personal digital assistant, rendering engine, mobile device, or dedicated hardware platform, such as a very large scale integrated (VLSI) circuit, a field-programmable gate array (FPGA), or an application specific integrated circuit (ASIC).

Hardware Overview

FIG. 1 depicts one architecture of a system 100 within which embodiments of the present invention may be implemented. This figure in no way limits or is intended to limit the scope of the present invention.

System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105. In one embodiment, the computer system 100 is configured to implement an assignment analysis system that may receive player detection location data and assign player identities and roles to the player detection location data, as further described herein.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs or multiview autostereoscopic images processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs, in the case of stereoscopic images, or generating and interleaving multiple views, in the case of multiview autostereoscopic images. The data and/or instructions defining the desired output images can be stored in system memory 104 or graphics memory within display processor 112. For example, CPU 102 could execute a client media player application (not shown) that receives a media stream from a content provider, and transmits the media stream to the display processor 112 for viewing on the display device 110. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Representing and Discovering Adversarial Team Behavior Using Player Roles

Techniques are presented for representing and discovering adversarial group behavior by assigning roles to group members. Although presented in the context of team sports that take place on a playing field, the described techniques as applied to any technically feasible environment where similar behavior is present are within the scope of this disclosure.

In comparison to other types of behavior, adversarial behavior is heavily structured in that the location of a player or, more generally, an agent, is dependent both on the player's teammates and adversaries, in addition to the tactics or strategies of the team. The described techniques may take advantage of this behavioral structure through the use of a spatiotemporal basis model. Players may change roles multiple times during a game or match. For example, a first player with the role of center forward in field hockey could swap roles with a second player with the role of right wing. After swapping roles, the first player would have the role of right wing, while the second player would have the role of center forward. Accordingly, employing a "role-based" representation, rather than a representation based on player "identity," may better represent the playing structure of the team. In addition, vision-based systems generally do not provide perfect detection/tracking, resulting in missed or false detections. The described techniques may "clean" the tracking data to compensate for such missed or false detections prior to assigning player roles, which in turn enables analysis of team formation and plays as may occur during continuous-play sports. The disclosed techniques also describe an approach to reduce the memory consumed by tracking data by converting the raw tracking data into a representation based on shape basis and trajectory basis. Such an approach takes advantage of the temporal smoothness of human motion to represent tracking data to reduce the amount of data to accurately reflect team player motion. As a result, the converted tracking data is stored and processed more efficiently, as compared with raw tracking data, enabling more significant temporal analysis by applications.

A group of individuals occupying a space, such as a crowd in a foyer or a gathering at a public square, may opportunistically exhibit recognizable patterns of interaction. For example, individuals may move so as to avoid collisions with each other or with structural constraints, such as lamp-posts. By contrast, for individuals in a team competitive environment, such as during games on a sports field, distinct and deliberate patterns of activity emerge in the form of plays, tactics, and strategies. In the former case, each individual pursues an individual goal based on an individual schedule. In the latter case, teams engage in adversarial goal-seeking, typically (although not necessarily) under the synchronized direction of a captain or a coach. Identifying such emergent patterns of play may aid fans, players, coaches, and broadcasters (including commentators, camera operators, producers, and game statisticians) in understanding as the game evolves and progresses.

The behavior of a team may be described by how team members cooperate and contribute in various situations. In team sports, the overall style of a team may be characterized by a formation, where a formation is a coarse spatial structure that the players maintain over the course of the match. Additionally, player movements are governed by physical limits, such as acceleration, resulting in smooth player trajectories over time. These two observations suggest significant correlation, and therefore redundancy, in the spatiotemporal signal of player movement data. This correlation may be exploited to generate an approximation of the spatiotemporal behavior of the players, while retaining sufficient accuracy to facilitate analysis. This approximation may aid applications in analysis that may improve understanding of team behavior. First, recovering an approximation of player behavior may enable the recovery of a true underlying signal from a set of player tracking data that may include false or missing detections. Second, these approximations may increase the ability of applications to recognize previously observed game situations in new data.

Even perfect tracking data may not be sufficient for understanding team behavior. A formation implicitly defines a set of roles or individual responsibilities which are distributed among the players by the captain or coach. In dynamic games like soccer or field hockey, players may opportunistically swap roles, either temporarily or permanently. As a result, when analyzing the strategy of a particular game situation, players are typically identified by the role the players are currently playing and not necessarily by an individualistic attribute like the name of the player. The disclosed techniques may be used to analyze detection and tracking data based on the role of each player at any given time, rather than by the identity of the player. Associating roles to player locations may provide a more compact low-dimensional representation, allowing the use of a bilinear spatiotemporal model that enables removal of tracking data "noise," such as errors caused by false or missing detections common in many vision systems. The compact low-dimensional representation may aid applications in identifying formations and plays quickly from a large repository, thus enhancing sports commentary by highlighting recurrent team strategies and long term trends in a sport. In addition, the process of post-game annotation, typically performed manually by coaches and technical staff over a period of many hours, may be automated. Such automatically annotated tracking data may enable applications to efficiently perform more detailed data mining. Such analysis may be employed by an automation system to predict motion on the field, where the predicted motion may direct robotic cameras to follow the action on the field.

Figure 2:
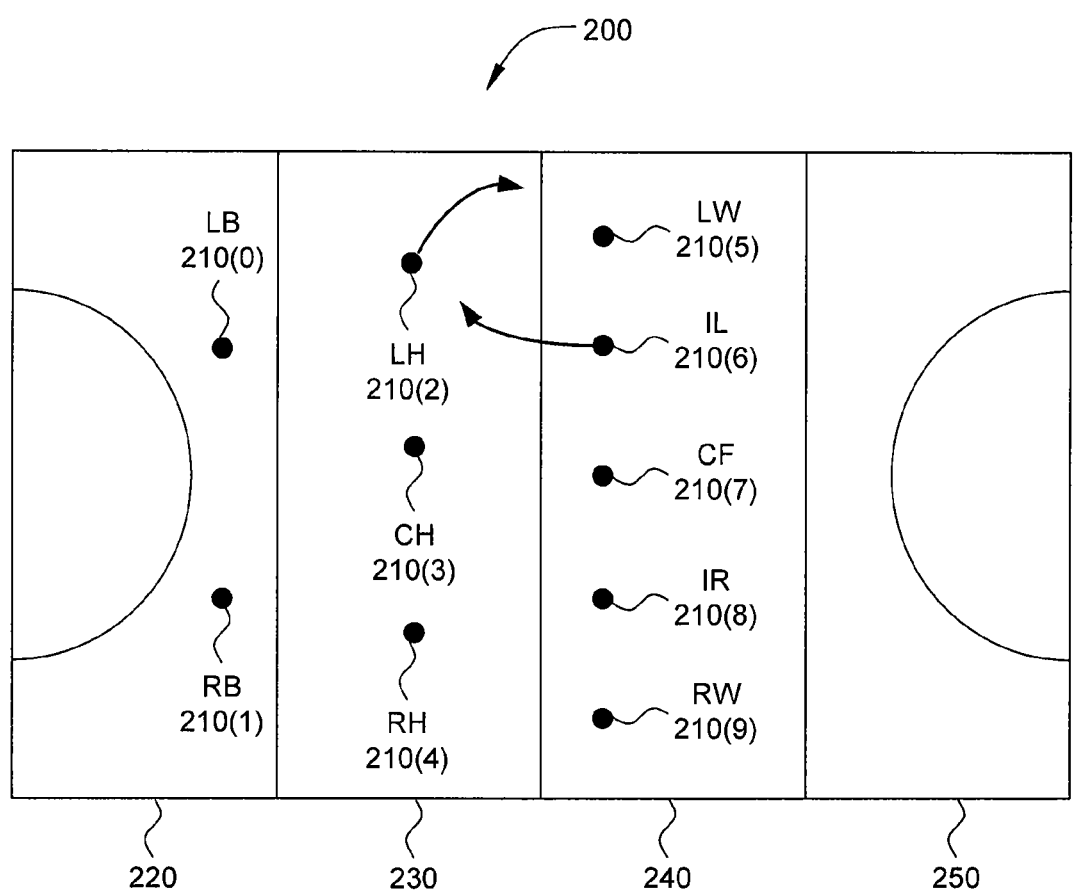
FIG. 2 illustrates a playing field where the players on a team are in a formation, according to one embodiment of the present invention.

FIG. 2 illustrates a playing field 200 where the players 210 on a team are in a formation, according to one embodiment of the invention. As shown, the players are in a 5-3-2 formation where five players are in field quadrant 240, three players are in field quadrant 230, and two players are in field quadrant 220.

In many team sports, a coach or captain designates an overall structure or system of play for a team. For example, in field hockey, the structure could be described as a formation involving roles or individual responsibilities for each player on the team. In the 5:3:2 formation illustrated in FIG. 2, the defined set of roles includes left back (LB), right back (RB), left halfback (LH), center halfback (CH), right halfback (RH), left wing (LW), inside left (IL), center forward (CF), inside right (IR), and right wing (RW), as assigned to players 210(0)-210(9) respectively. Each player is assigned exactly one role, and every role is assigned to only one player. Generally, roles are not fixed. During a match, players may swap roles and temporarily adopt the responsibilities of another player, typically to exploit a tactical opportunity or to respond to behavior of the adverse team. As shown in FIG. 2, player 210(2) may move to a position the outside of player 210(5), taking the role of left wing. In response, player 210(6) may move toward the prior position of player 210(2), taking the role of left halfback. Player 210(5) then assumes the role of inside left.

A player tracking system may generate a series $\mathcal{O}$ of observations, where each observation includes the (x, y) position of each player on the field, a team estimate $\mathcal{T} \in \{\alpha, \beta\}$ for each player, and a time stamp t. At any given time instant t, the set of detected player locations $\mathcal{O}_t = \{x_A, y_A, x_B, y_B, \ldots\}$ is of arbitrary length. That is, the number of detections $N_t$ at time t may not necessarily be equal to the number of players P on a team because some players may not have been detected, background noise may have been incorrectly classified as a player, or a player may be off-field due to a penalty.

Typically, the goal is to track all 2P players over the duration of the match. In field hockey, that corresponds to tracking 20 players, where P=10 players per team excluding the goalkeepers, over two halves of 35 minutes each. The tracking all players across time may be expressed as a vector of ordered player locations $\mathbf{p}_t^{\mathcal{T}} = [x_1, y_1, x_2, y_2, \ldots, x_P, y_P]^T$ for each team $\mathcal{T}$ from the potentially noisy detections $\mathcal{O}_t$ at each time instant. Although the particular ordering of players may be arbitrary, the ordering is consistent across time. As such, $\mathbf{p}_t^{\mathcal{T}}$ may be considered to be a static labeling of player locations. Note that $\mathbf{p}_t^{\mathcal{T}}$ is not generally a subset of $\mathcal{O}_t$. For example, if a player is not detected at a given observation time, the (x, y) position of the undetected player may be inferred based on spatiotemporal correlations. Any observed arrangement of players from the first team α may also be observed for players of the second team β, but in the opposing direction. As such, team β observation data may exhibit a 180° symmetry with respect to team α observation data. That is, for any given vector of player locations $\mathbf{p}_t^T$, there is an equivalent complementary vector $\overleftrightarrow{\mathbf{p}}_t^T$ that may be derived by rotating all (x, y) locations about the center of the field and swapping the associated team affiliations.

As described herein, a coach or captain may designate an overall structure, or formation, that establishes roles or individual responsibilities for each team player. Mathematically, assigning roles to players is equivalent to permuting the player ordering $\mathbf{p}_t^T$. A permutation matrix $\mathbf{x}_t^T$, of size P×P, may be defined at time t, where the permutation matrix describes the players in terms of roles $\mathbf{r}_t^T$, according to Equation 1 below:

$$\mathbf{r}_t^T = \mathbf{x}_t^T \mathbf{p}_t^T \qquad \text{Equation 1}$$

where each element $\mathbf{x}_t^T(i,j)$ of the permutation matrix $\mathbf{x}_t^T$ is a binary variable with value 0 or 1, and each column and row of the permutation matrix $\mathbf{x}_t^T$ sums to 1. Accordingly, if $\mathbf{x}_t^T(i,j)=1$, then player i is assigned to role j. As such, whereas the ordered player locations $\mathbf{p}_t^T$ is considered to be a static labeling of player locations, the set of roles $\mathbf{r}_t^T$, is a dynamic labeling of player locations.

Because the spatial relationships of a formation are defined in terms of roles, and not in terms of individualistic attributes like player name or jersey number, and because players swap roles during a game, the spatiotemporal patterns based on the set of roles $\{\mathbf{r}_1^T, \mathbf{r}_2^T, \ldots, \mathbf{r}_t^T\}$ may be more compact as compared with the spatiotemporal patterns based on individual players $\{\mathbf{p}_1^T, \mathbf{p}_2^T, \ldots, \mathbf{p}_t^T\}$. In addition, because a team may be expected to maintain the same formation (set of roles) as the team moves up the field and down the field, the player position data $\tilde{\mathbf{r}}_t^T$ relative to the mean (x, y) location of the team may be more compressible as compared with the absolute player position data $\mathbf{r}_t^T$.

A player's movements are correlated not only to the positions and roles of teammates but to the positions and roles of opposition players as well. As such, player location data may be further compressed if the locations of players on teams A and B are concatenated into a single vector $p_t^{AB}=[p_t^A, p_t^B]^T$, referred to as adversarial representation. Employing an adversarial representation of player locations may achieve better compressibility than using only ordered player, $\mathbf{p}_t^T$, or role, $\mathbf{r}_t^T$, position data of one team. Using both a role and adversarial representation together, $r_t^{AB}=[r_t^A, r_t^B]^T$, may yield more compressibility than using either role representation or ordered player based adversarial representation alone.

A bilinear spatiotemporal basis model that captures and exploits the dependencies across both the spatial and temporal dimensions in an efficient manner may be applied to the location data described herein. Given P players per team, or 2P total players, sampled at F time instances, the role-based adversarial representation x may be formed as a spatiotemporal structure S, according to equation 2 below:

$$S_{F \times 2P} = \begin{bmatrix} x_1^1 & \ldots & x_{2P}^1 \\ \vdots & & \vdots \\ x_1^F & \ldots & x_{2P}^F \end{bmatrix} \qquad \text{Equation 2}$$

where $x_j^i$ denotes the jth index within the role representation at the ith time instant. Accordingly, the time-varying structure matrix S includes 2FP parameters. This representation of the structure S is an over-parameterization in that the representation does not take into account the high degree of regularity generally exhibited by motion data. In one embodiment, this regularity in spatiotemporal data may be exploited by representing the 2D formation or shape exhibited by the players on a team at each time instance as a linear combination of a small number of shape basis vectors $b_j$ weighted by coefficients $\omega_j^i$ as $s^i=\Sigma_j\omega_j^i b_j^T$. Alternatively, the time-varying structure may be represented by modeling the representation in the trajectory subspace, as a linear combination of trajectory basis vectors $\theta_i$ as $s_j=\Sigma_i\alpha_i^j\theta_i$, where $\alpha_i^j$ is the coefficient weighting each trajectory basis vector. As a result, the complete structure matrix may be represented by Equation 3 below:

$$S=\Omega B^T \qquad \text{Equation 3}$$

where $\Omega$ is a $F \times K_s$ matrix that includes the corresponding shape coefficients $\omega_j^i$, and B is a $P \times K_s$ matrix that includes $K_s$ shape basis vectors, each of which represents a 2D structure of length 2P. Alternatively, the complete structure matrix may be represented by Equation 4 below:

$$S=\Theta A^T \qquad \text{Equation 4}$$

where $\Theta$ is a $F \times K_t$ matrix that includes $K_t$ shape basis vectors trajectory bases as the columns, and A is a $2P \times K_t$ matrix of trajectory coefficients. The quantity of shape basis vectors used to represent a particular instance of motion data is represented by $K_s \leq \min\{F, 2P\}$, and $K_t \leq \{F, 2P\}$ is the quantity of trajectory basis vectors spanning the trajectory subspace.

Both representations of S are over-parameterizations in that the representations do not capitalize on either the spatial or temporal regularity exhibited in the data. Because S may be expressed exactly either by Equation 3 or by Equation 4, then there exists a factorization as shown in Equation 5 below:

$$S=\Theta C B^T \qquad \text{Equation 5}$$

where $C=\Theta^T\Omega=A^TB$ is a $K_t \times K_s$ matrix of spatiotemporal coefficients. Equation 5 describes the bilinear spatiotemporal basis, which includes both shape and trajectory bases linked together by a common set of coefficients.

Due to the high degree of temporal smoothness in the motion of humans, a predefined analytical trajectory basis may be used without significant loss in representation accuracy. In one embodiment, the conditioning trajectory basis may be a Discrete Cosine Transform (DCT) basis. The DCT basis may be close to the optimal Principal Component Analysis (PCA) basis if the location data is generated from a stationary first-order Markov process. Given the high temporal regularity typically present in human motion, the DCT basis may be particularly appropriate for trajectories associated with human faces and bodies. Due to the highly structured nature of typical adversarial team sports, and the fact that human motion is relatively simple when measured over short periods of time, significant dimensionality reduction may be achieved, particularly in the temporal domain. For example, five-second plays could be effectively represented with no more than $K_t=3$ and $K_s=33$ with a maximum error of less than two meters. In terms of dimensionality reduction, temporal signals could be represented using 3×33=99 coefficients, resulting in a 60:1 reduction in dimensionality. Greater compressibility could be achieved where plays are longer than five seconds.

Roles may be assigned automatically to the arbitrary order of player locations $\mathbf{p}_t^T$.

Assuming that a prototype formation with role ordering exists, which is denoted as $r_{proto}^T$, the optimal assignment of roles may be defined as the permutation matrix $x_t^{T*}$ that minimizes the square $L_2$ reconstruction error as expressed in Equation 6 below:

$$x_t^{T\star} = \underset{x_t^T}{\operatorname{argmin}} \| r_{proto}^T - x_t^T \, \mathbf{p}_t^T \|_2^2 \qquad \text{Equation 6}$$

Equation 6 represents a linear assignment problem, where an entry $C(i, j)$ in the cost matrix represents the Euclidean distance between role locations as shown in equation 7 below:

$$C(i,j) = \| r_{proto}^T(i) - \mathbf{p}_t^T(j) \|_2 \qquad \text{Equation 7}$$

In one embodiment, an optimal permutation matrix may be found in polynomial time using the Hungarian, or Kuhn-Munkres algorithm, as further described herein.

As a starting point, a reference formation is selected that represents the mean starting formation of the team, such as a formation that is commonly used by the team at the beginning of a segment of play. Such a reference formation may be predetermined or may be selected via any technically feasible approach, including, without limitation, selecting the reference formation from a codebook, selecting the reference formation from a set of formations learned from prior tracking data, or receiving the reference formation as an input from a user. As play progresses, subtle changes in the formation may occur for various reasons, including, without limitation, the behavior of the opposing team and the current state of the game.

In some embodiments, these formation changes are incorporated by selecting new formations from a codebook of possible formations that the team may employ. The formations from the codebook may be mapped to a set of "training data" where the training data includes sample location data from play segments examples that have been identified with assignment labels corresponding to the named formations from the codebook.

As such, a mapping matrix W may be learned by an analysis application by comparing the mean and covariances of the training data with the assignment labels corresponding to the training data. Given N training segment examples, the mapping matrix W may be learned by concatenating the mean and covariance into an input vector $z_n$ corresponding to the labeled formation $x_n$ from the codebook. The resulting vectors may be compiled into grand profile matrices X and Z. Given these grand profile matrices, linear regression may be employed to learn the mapping matrix W by solving Equation 8 below:

$$W = XZ^T(ZZ^T + \lambda I)^{-1} \qquad \text{Equation 8}$$

where $\lambda$ is a regularization term. Using this approach, a labeled formation may be estimated from the training data set that best describes the current unlabeled data set. This approach may produce more accurate assignment performance as compared with using the mean formation for both player identity and role labels.

In practice, vision-based player detection systems do not generate perfect player position data. As such, the techniques described herein interpret "noisy" player location data from such systems, where noisy data may include missed and false detections.

In one embodiment, a vision based player detection system may generate frames of player location data at a fairly high rate, such as 30 frames per second, and may simultaneously analyze video data from multiple camera sources. The vision based system may determine player positions by subtracting background information representing the field (i.e., the static part of the captured scene) from the received video data and employing a coarse 3D geometric model of a person to identify the position of each player on the field. Once the locations of all players are determined, players may be classified as members of the respective teams by using a color model for each team that, for instance, represents the colors of the uniforms for each team. Each player image may be represented as a histogram in an appropriate color space, including, without limitation, LAB color space, CIE color space, or RGB color space. A generalized model for each team may be learned by using an approach involving K-means clustering using the Bhattacharyya distance. A player may be considered as detected if the player is within two meters of a ground-truth label.

As a starting point, the majority of player detections and team affiliations as determined by the player detection system may be assumed to be correct. Each player detection is assigned a label if the detection is deemed to be accurate, or discarded if the detection is deemed to be too noisy. To determine whether or not a detection should be assigned a label or discarded, some feature of the game context is determined, such as the section of the field where most of the team players are positioned. An approach, such as the approach described above to assign roles to players, is employed to determine this game context. However, rather than learning the mapping from the clean features Z of the team formation, as in the case of role assignment, the mapping is learned from the noisy features $Z_{noisy}$. Such noisy features may result from "black-spots" on the field where a portion of the field is not visible to any of the cameras, either based on the current camera positions or due to a concentration of players in a portion of the field. Such black spots may result in a missed detection. Accordingly, the noisy feature context $Z_{noisy}$ includes the quantity of players detected from the player tracking system as well as mean and covariance information. The assignment analysis system then learns the noisy mapping matrix $W_{noisy}$ from the noisy feature context $Z_{noisy}$. In doing so, the assignment analysis system may assume that the clean centroid team position is a good approximation of the noisy centroid team position. With this assumption, the assignment analysis system may select a reasonable prototypical formation to make player assignments.

In one embodiment, the assignment analysis system may use the estimated prototype formation to assign players to roles by using the so-called "Hungarian algorithm," where the Hungarian method is an optimization algorithm that resolves assignment problems by determining a lowest cost path. Missed and player false detections may alter the one-to-one mapping between the prototype formation and the input detections, which may lead to erroneous assignments. To resolve missed and false detections, an exhaustive approach may be used, such that if fewer player detections are received than the quantity of players in the prototype formation, then the assignment analysis system may determine all possible role assignments for the detected players, and then selects the combination that yields the lowest cost. If more player detections are received than the quantity of players in the prototype formation, then the assignment analysis system may determine all possible combinations that the detections could be and then may select the combination of detections with the lowest cost.

For example, if nine players are detected for a prototype formation that includes ten players, then the assignment analysis system could compute the ten possible combinations that the detected players could be mapped to the prototype formation, namely: [2, 3, 4, ..., 10], [1, 3, 4, ..., 10], [1, 2, 4, ..., 10], [1, 2, 3, 5, ..., 10], ..., [1, 2, 3, ..., 9]. The assignment analysis system could perform the Hungarian algorithm for each of these combinations and calculates the cost of the potential assignments. After the cost of each combination is calculated, the assignment analysis system would select the potential assignment that yields the lowest cost. If eleven players are detected for a prototype formation that includes ten players, then the assignment analysis system could compute each of the eleven possible combinations, where each combination includes ten of the eleven detections. The assignment analysis system could then calculate the cost of each of the possible combinations and would select the combination with the lowest cost. Even if ten detections are received for a ten-player prototype formation, some detections could be false positives, where only seven or eight of the ten detections represent valid candidate player positions. In such cases, the assignment analysis system could filter such potential false detections. The assignment analysis system could remove player detections that are more than a threshold distance, such as twenty meters, from the nearest other player.

Employing this approach may improve the assignment precision rate, while the recall rate may decrease, where the precision rate is the fraction of retrieved instances that are relevant and the recall rate is the fraction of relevant instances that are retrieved. In one example, a set of detections for ten players could include a total of seven actual detections where one of the seven detections is a false positive. Because six of the ten players are accurately detected, the recall rate would be 6/10 or 60%. Because six of the seven detections are true positives, the precision is 6/7 or approximately 86%. If, after a filtering operation, the false positive and one of the true positives is removed from the set of detections, then the set of detections would include five a total of five actual detections with no false positives. Accordingly, the recall rate would decrease to 5/10 or 50% while the precision rate would increase to 5/5 or 100%. However, even with a reduced recall rate, role assignments using these techniques may be improved over using raw player position data.

The assignment analysis system computes a continuous estimate of the player label at each time step over a period of time by temporally smoothing the data computed at each time step. This continuous estimate is then used for further formation and play analysis.

To do so, the assignment analysis system may perform an expectation maximum (EM) process, using the spatial bases, the bilinear coefficients and an initial estimate of the player labels as inputs to the process. In one embodiment, the expectation phase of the EM process may be simplified to making an initial assignment of the player labels, which may be determined from the initial assignments calculated using the approach described above. From this initial assignment, an initial value for $S_{init}$ may be determined. During the maximization phase of the EM process, the value C may be calculated as $C = \theta^T S_{init} B$. The final value $S_{final}$ may then be estimated from the calculated value of C, the spatial basis B and the temporal basis $\theta$.

Tracking Players Using Non-Rigid Formation Priors

As described above, players may be assigned to roles based on player detection data and a prototype formation, such as a formation selected from a code book. As play progresses, players may instantaneously swap roles. Such players may not necessarily be next to each other when the players swap roles. As such, while the players themselves may move a limited distance between position detection frames, the set of roles do not generally have such spatiotemporal constraints. Player identities and roles may be assigned to unlabeled (x, y) position data, where player identity may be assigned based on spatiotemporal constraints, while player roles may be assigned based on only spatial properties, using absolute position and position relative to other players. Roles change may be assumed to be infrequent, such that the spatial prior of a formation may be combined with the spatiotemporal prior of player inertia to track player identities and roles over time. Such identity and role assignments may be applied throughout a game or match and compared with similar data from other matches from a current or prior season. Such an approach may enhance game analysis both during a game or match and after completion of the game or match.

Once roles are assigned to player detections at a particular time instance, as described above, identities and roles may be assigned to a sequence of detections over time, where the assignment analysis system considers not only the likelihood of per-frame identity and role assignments, but also the temporal consistency of these assignments across sequential detection frames.

Figure 3:
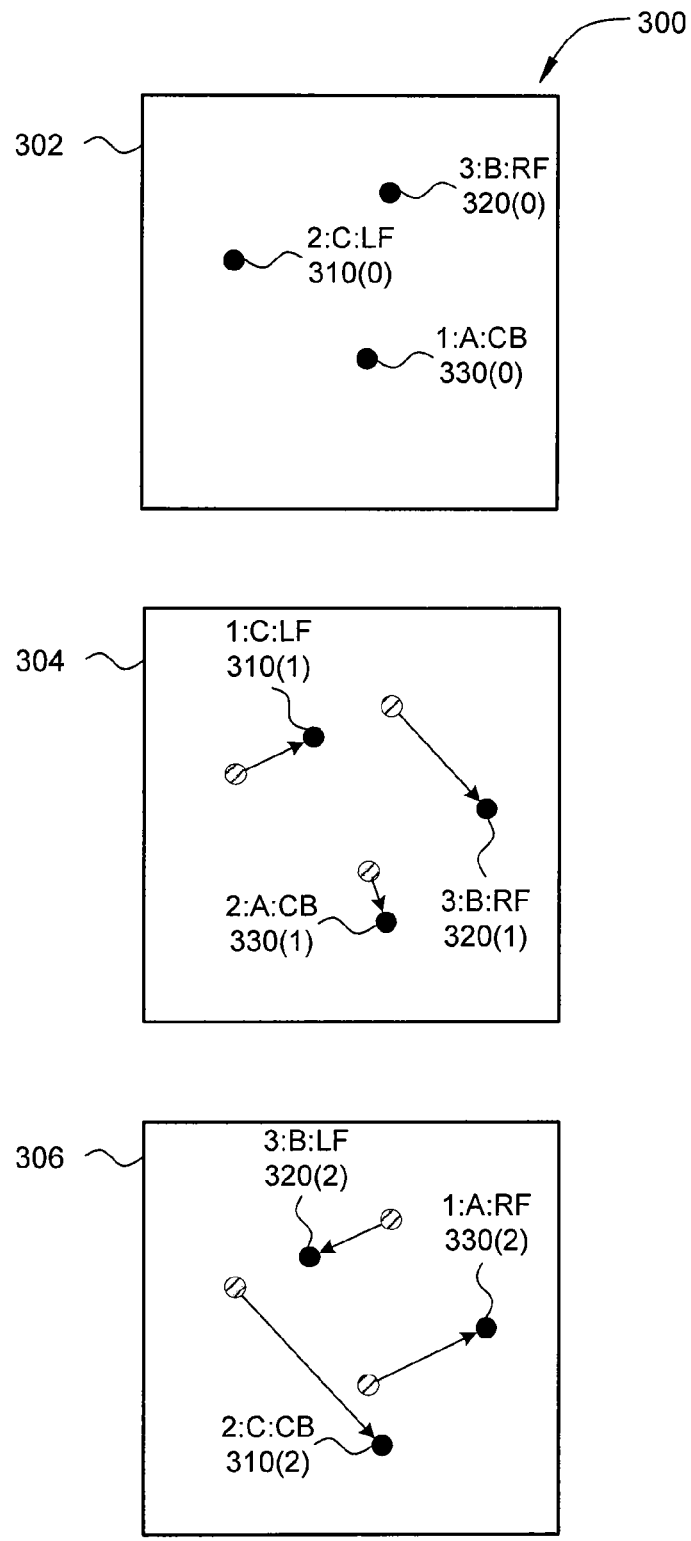
FIG. 3 illustrates a set of identity and role assignments for a subset of team players, according to one embodiment of the present invention.

FIG. 3 illustrates a set of identity and role assignments 300 for a subset of team players, according to one embodiment of the present invention. As shown, the set of identity and role assignments 300 includes three players 310, 320, 330 in an initial position 302, a potential second position 304, and an alternate potential second position 306.

The initial position 302 includes three players 310(0), 320(0), 330(0), where each player is associated with a triplet I:L:R, where 'I' is an arbitrary index from the player detection system, 'L' is a label assigned to identify the player, and 'R' is a role assigned to the player.

As shown, the index I is a numerical value that the player detection system arbitrarily assigns to each detection in a given detection frame. As such, the index I for a given player may vary arbitrarily from one detection frame to the next. The array of indices for the three players in the initial position 302 at a given time t shown may be expressed by $d_t = [1, 2, 3]^T$.

The label L is a label assigned to each player to identify a particular player. The label may be any technically feasible characteristic that is attached to a particular player, including, without limitation, a player name, a jersey number, or other identifying characteristic. As shown, the label L is a single letter assigned to each individual player. The array of labels for the three players in the initial position 302 at a given time t shown may be expressed by $\mathcal{P}_t = [A, B, C]^T$. The label of a player may also be referred to as the identity of the player.

The role R is the player position or role assigned to each player. For example, the role R could be an abbreviation for the position of each player. The array of labels for the three players in the initial position 302 at a given time t shown may be expressed by $\mathcal{R} = [LF, CB, RF]^T$, corresponding to the roles of left forward, center back, and right forward, respectively.

Player 310(0) is associated with the triplet 2:C:LF, indicating that the player 310(0) is identified as player C having the role of left forward, and being the second player detection at the initial position 302. Player 320(0) is associated with the triplet 3:B:RF, indicating that the player 320(0) is identified as player B having the role of right forward, and being the third player detection at the initial position 302. Player 330(0) is associated with the triplet 1:A:CB, indicating that the player 330(0) is identified as player A having the role of center back, and being the first player detection at the initial position 302.

The potential second position 304 includes the three players 310(1), 320(1), 330(1), at a time after the initial position 302. As shown, the three players 310(1), 320(1), 330(1) have moved to new positions, where each player has retained the role assigned at the initial position 302. That is, player A is the center back, player B is the right forward, and player C is the left forward.

The alternate potential second position 306 includes the three players 310(2), 320(2), 330(2), at a time after the initial position 302. As shown, the three players 310(2), 320(2), 330(2) have moved to new positions, and each player has moved to a new role as compared with the initial position 302. That is, player A has advanced and moved to the right, moving from the center back role to the right forward role. Player B has moved left field, moving from the right forward role to the left forward role. Player C has dropped back and to the right, moving from the left forward role to the center back role.

The team as a whole has a set of $\mathcal{P}$ players who are dynamically assigned responsibilities from a set of $\mathcal{R}$ roles, where the set of roles is generally defined by the strategy employed by the team, and may be determined by a particular formation. Typically, each player is assigned one role, and every role is assigned to one player.

The assignment analysis system may infer the role fulfilled by each player at each time instant corresponding to a detection frame. The input data from the player detection system is a set of detected 2D player positions $\mathcal{D}_t$ at each time instant t given by the equation: $\mathcal{D}_t = \{(x,y)_1, (x,y)_2, \ldots (x,y)_N\}$, where N is the number of detected players. Both an identity and a role are assigned to each (x, y) detection. Roles refer to players in an abstract strategic sense. As such, there is a one-to-one mapping between the set of identities and the set of roles. At each time instant, each identity and each role is assigned to one detection, and each detection includes one associated identity and one associated role associated to it. Accordingly, two assignment problems are simultaneously resolved for the set of detections, one for role assignment and another for label or identity assignment.

An assignment of roles may be represented as a permutation that shuffles the set of player detections into role order. Likewise, an assignment of identities may be represented as a permutation that shuffles the set of player detections into identity order.

A permutation of N elements may be represented in one of three ways: (1) as an integer s∈[1, N!] indexing a particular permutation in the set $\mathcal{S}_N$ of permutations; (2) as a vector ŝ of permuted indices ranging from 1 to N; or (3) as an N×N binary matrix S. As used herein, a caret accent identifies a vector of permuted indices, as distinguished from a vector of permutations. A set of N individual assignments encoded in a permutation may be recovered by multiplying the vector $d_t \triangleq [1, 2, 3, \ldots, N]^T$ by the corresponding permutation matrix.

Because assignments of identities and roles to the set of detections $\mathcal{D}_t$ at time t may be represented as permutations, the variables P and R may be defined to represent the permutations indicating the indentify assignments and role assignments, respectively, for the time interval t∈[1, T] as shown in Equations 9 and Equation 10 below:

$$P=[P_1,P_2,\ldots,P_T] \quad \text{Equation 9}$$

$$R=[R_1,R_2,\ldots,R_T] \quad \text{Equation 10}$$

Each $P_t \in \mathcal{S}_N$ represents a permutation which assigns identities $\mathcal{P}$ at time t. Similarly, each $R_t$ represents a permutation which assigns roles $\mathcal{R}$ at time t. A set of more probable role and identity assignments may be determined given a time sequence of detections: $D=[\mathcal{D}_1, \mathcal{D}_2, \ldots, \mathcal{D}_T]$.

The assignment of permutations $(P_t=p_t)$ and $(R_t=r_t)$ implies N individual assignments of identity and role, which may represented as vectors of permuted indices: $\hat{p}_t = P_t d_t$ and $\hat{r}_t = R_t d_t$, respectively.

For example, the three players of FIG. 3 may be represented by player labels/identities $\mathcal{P} = \{A, B, C\}$, and player roles $\mathcal{R} = \{LF, CB, RF\}$. Given three players, there exists six possible permutations $\mathcal{S}_3 = [(1,2,3), (1,3,2), (2,1,3), (2,3,1), (3,1,2), (3,2,1)]$.

If the second permutation is selected for the identities assignment (P=2), then the player identity assignment may be expressed according to equation 11 below:

$$(P=2) \equiv \left( \hat{p} = \begin{bmatrix} 1 \\ 3 \\ 2 \end{bmatrix} \right) \equiv \begin{array}{l} A \to (x,y)_1 \\ B \to (x,y)_3 \\ C \to (x,y)_2 \end{array} \quad \text{Equation 11}$$

If the third permutation is selected for the roles assignment (R=3), then the player role assignment may be expressed according to equation 12 below:

$$(R=3) \equiv \left( \hat{r} = \begin{bmatrix} 2 \\ 1 \\ 3 \end{bmatrix} \right) \equiv \begin{array}{l} LF \to (x,y)_2 \\ CB \to (x,y)_1 \\ RF \to (x,y)_3 \end{array} \quad \text{Equation 12}$$

As shown in FIG. 3, player identities are given by alphabetic labels A, B, C, ..., rather than by player name or jersey number. Accordingly, the player identities may be given by the set of alphabetic labels $\mathcal{L} = \{A, B, C, \ldots\}$. Solving for player identities P may then be expressed as solving for a vector of label variables $L=[L_1, L_2, \ldots, L_T]$, where each $L_t \in \mathcal{S}_N$ represents a given permutation that assigns labels $\mathcal{L}$ to player detections. The assignment problem may then be expressed as inferring to most probable sequence of labels $L=[L_1, L_2, \ldots, L_T]$ and roles $L=[L_1, L_2, \ldots, L_T]$ to assign to a temporal sequence of detections $\mathcal{D}$ as given by equation 13 below:

$$(l,r)^* = \arg\max P(L=l, R=r|D)(l,r) \quad \text{Equation 13}$$

The joint assignment $((L_t=l_t) \cap (R_t=r_t))$ of labels and roles at time t may be represented by $Y_t \in \mathcal{S}_N \times \mathcal{S}_N$. Both labels/identities assignments and roles assignments may exhibit a temporal Markov property and, accordingly, the problem may be modeled as a linear-chain conditional random field. As a result, the conditional probability factors as a product of exponential functions involving potential energies $U_t(y_t, y_{t-1}, \mathcal{D}_t)$, as given by Equation 14 below:

$$P(L=l, R=r|D) = P(Y=y|D) = \frac{1}{Z(D)} \prod_{t=1}^{T} e^{-U_t(y_t, y_{t-1}, \mathcal{D}_t)} \quad \text{Equation 14}$$

The partition function Z(D) is a normalization constant that depends on the observed data, but does not affect the optimization process. The assignment problem of equation 13 may then be equivalent to minimizing the negative log likelihood as expressed by the alternative assignment problem of Equation 15 below:

$$y^\star = \operatorname*{argmin}_y \sum_{t=1}^{T} U_t(y_t, y_{t-1}, \mathcal{D}_t) \quad \text{Equation 15}$$

The potential energy function at each time instant may be modeled as a collection of functions which examine the likelihood of independent assignments of labels $E_t(l_t, \mathcal{D}_t)$ and roles $E_t(r_t, \mathcal{D}_t)$ at each time instant, as well as independent temporal transitions, $E_t(l_t, l_{t-1}, \mathcal{D}_t)$ and $E_t(r_t, r_{t-1}, \mathcal{D}_t)$, and the joint transition $E_t(l_t, r_t, l_{t-1}, r_{t-1}, \mathcal{D}_t)$ as shown in Equation 16 below:

$$U_t(y_t, y_{t-1}, \mathcal{D}_t) = E_t(l_t, \mathcal{D}_t) + E_t(r_t, \mathcal{D}_t) + E_t(l_t, l_{t-1}, \mathcal{D}_t) + E_t(r_t, r_{t-1}, \mathcal{D}_t) + E_t(l_t, r_t, l_{t-1}, r_{t-1}, \mathcal{D}_t) \quad \text{Equation 16}$$

The optimal sequence of labels and roles assignments may be determined by mapping the energies to edge weights in a trellis graph, as further described herein, and determine the shortest path through the graph using dynamic programming.

Under some circumstances the assignments of labels and roles to player detections may be ambiguous. For example, when a player crosses the path of another player exchanging roles, the appropriate label or role corresponding to one or more (x, y) detections may be difficult to determine. In addition, both players may appear to be out of formation during the role exchange. Because a set of detections $D_t$ may have multiple feasible assignments of labels and roles, a sequence of optimal per-frame solutions may result in an uninformative solution that differs significantly from frame to frame, leading to assignments that rapidly flicker among two or more possibilities between successive detection frames. To counteract this effect, an approximately optimal sequence may be determined by searching for a consistent temporal configuration of labels and roles assignments among the top k independent solutions produced for each time instant.

The quantity $N!^{2T}$ of possible sequences of labels and roles assignments increases significantly as the number of players and time steps increases. For example, for a ten-player team, a single time instant $Y_t$ includes approximately $1.3 \times 10^{13}$ possible assignment sequences. In practice, a relatively small quantity of these possible assignments are feasible. As such, the temporal search space of possible assignments may be pruned by identifying the top k feasible assignments of labels and roles at each time instant.

In an alternative approach, the assignment analysis system may assign only roles without assigning labels or identities. The probability of an assignment of roles for a single time instant is given by $E_t(r_t, \mathcal{D}_t)$. Because players may swap roles at any time, there is no direct relationship between roles assignments at time t and at time T>t. Accordingly, $E_t(r_t, r_{t-1}, \mathcal{D}_t) = 0$.

Figure 4:
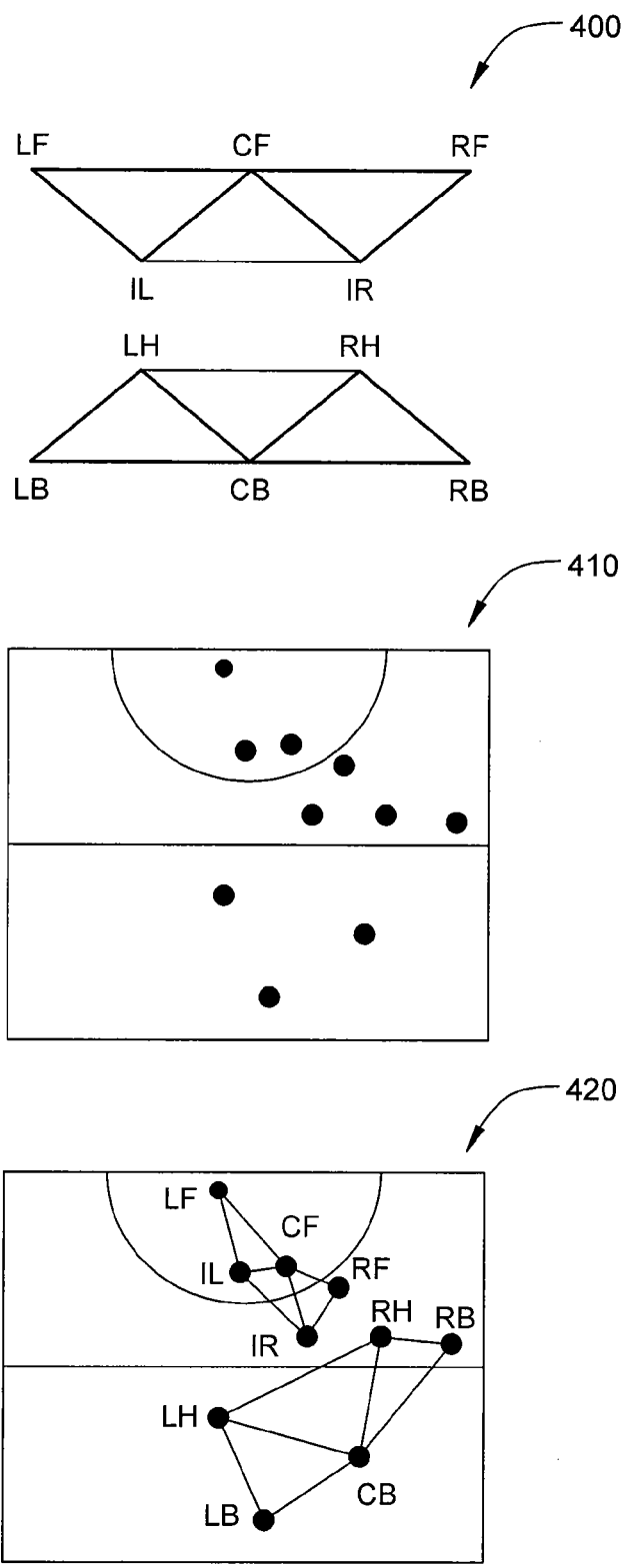
FIG. 4 illustrates a formation, a set of player detections, and a formation-detection mapping, according to one embodiment of the present invention.

FIG. 4 illustrates a formation 400, a set of player detections 410, and a formation-detection mapping 420, according to one embodiment of the present invention.

The formation 400 illustrates a "W-M" formation, so named because the subformation of the upper five players resembles the letter "W," and the subformation of the lower five players resembles the letter "M." The positions of the players in the formation 400 are shown in an initial or default position, and may match the positions shown for this formation 400 in a corresponding code-book.

The set of player detections 410 shows the positions of the ten players on the field. The set of player detections 410 may come from a player detection system, as described herein. The set of player detections 410 may include positional data only, without a mapping of the player detections to either the label/identity or the role of each player.

The formation-detection mapping 420 shows the mapping of the players in the formation 400 to the set of player detections 410. As further described herein, players are assigned to roles based on a probability model and the formation 400.

A formation 400 may be defined as a planar graph $\mathcal{F} = (\mathcal{R}, E)$, where each vertex represents a particular role $\mathcal{R}$, and where triangulated edges E between vertices explicitly model spatial relationships.

For example, the left forward could be defined as the player to the left of the center forward and in front of the left midfielder. Accordingly, if the above description is true, the triangle formed by [LF, CF, LM] would have an area of greater than zero. During play, the graph of the formation 400 deforms elastically as players move around the field, but where players maintain the formation 400.

If the shape of the formation is defined in terms of player labels or identities, the graph of the formation 400 may exhibit internal twists as players exchange roles during play. As such, the formation 400 would no longer be in canonical form. As a result, the analysis may be unable to track players based on prior data, other than local kinematic constraints based on how much each player may move between successive detection frames. On the other hand, if roles are identified, rather than labels, then the graph of the formation 400 may remain planar, in that the formation 400 exhibits no intersecting edges.

Because roles are defined by spatial properties and relationships among players, the assignment analysis system may infer player roles based on a set of player detections 410 that includes a set of (x, y) player detection locations. Three contextual cues may be used to determine an optimal assignment of roles to detections, namely absolute (abs) context, relative (rel) context, and neighborhood (nbr) context, as shown in Equation 17 below:

$$E(r_t, \mathcal{D}_t) = E^{abs}(r_t, \mathcal{D}_t) + E^{rel}(r_t, \mathcal{D}_t) + E^{nbr}(r_t, \mathcal{D}_t) \quad \text{Equation 17}$$

Absolute context and relative context evaluate the likelihood of a specific role being assigned to a particular detection, while neighborhood context evaluates the feasibility of the combination of the individual assignments. Each of these three contexts is described in turn.

With the absolute context, the assignment analysis system learns the 2D probability function $P(\mathcal{R}(i)|\mathcal{D}_t(j))$ of an (x, y) detection location having a particular role based on manually-labeled exemplar data. The playing surface is divided into a collection of discrete cells, and frequency counts are generated that tabulate how often each role occupies each cell. Using these frequency counts, the probability for each individual role assignment occupying each (x, y) location in $\mathcal{D}_t$ may be computed. The results for all roles and all field locations may be combined to generate an energy map that reflects the probability of the assignment $r_t$ of roles. The energy function of the absolute context is given by Equation 18 below:

$$E^{abs}(r_t, \mathcal{D}_t) = -\lambda^{abs} \sum_i \log P(\mathcal{R}(i) | \mathcal{D}_t(\hat{r}_t(i))) \quad \text{Equation 18}$$

With the relative context, all other locations $\{\mathcal{D}_t \backslash \mathcal{D}_t(j)\}$ are expressed in coordinates relative to $\mathcal{D}_t(j)$. As such, t player roles are defined by relative locations. For example, a left forward could be defined as the player in front of and to the left of all other players. Equivalently, all roles other than the left forward would have a relative position that is behind and to the right of the left forward.

A descriptor $G(\mathcal{D}_t(j))$ may be computed for each detection $(x, y)_j$ in $\mathcal{D}_t$ by computing the locations of the remaining detections in $\mathcal{D}_t$ relative to $(x, y)_j$. The relative displacements may then be coarsely quantized in terms of distance and angle. A threshold distance may be selected, below which relative distance may be deemed to be insignificant. For example, a threshold of three meters may be selected. As a result, if two players are detected within three meters of each other, the relative distance of the two players would be deemed to be zero. Accordingly, given a reference player, other players would be sorted into five bins relative to the reference player: within three meters, in front, behind, left, and right. An exemplar descriptor $G(\mathcal{R}(i))$ could be learned for each role using the manually-labeled training data. The cost of assigning a particular role to a detection would be based on the distance between the descriptor generated for the $(x, y)_j$, the learned exemplar descriptor for the hypothesized role. The energy function of the relative context is given by Equation 19 below:

$$E^{rel}(r_t, \mathcal{D}_t) = \lambda^{rel} \sum_i d(G(\mathcal{R}(i)), G(\mathcal{D}_t(\hat{r}_t(i)))) \quad \text{Equation 19}$$

With the neighborhood context, spatial relationships among the players are encoded using a triangular mesh. The roles of the players are defined through spatial relationships that exhibit particular patterns in the triangular mesh. An assignment of roles may maintain these patterns. Although the formation 400 may deform elastically as the players move on the field, an assignment of roles may maintain the planarity of the triangular mesh such that no edges of the triangular mesh intersect.

Because a planar graph has no intersecting edges, a neighborhood context energy function may be defined that is proportional to the number of edge intersections induced by a particular assignment of roles.

However, players may occasionally deviate from the formation 400, such as when three players spread out to create a line. To achieve a temporally consistent solution over long time periods of play, the assignment analysis system may allow the assignment of roles to slightly violate the planar constraint. Accordingly, an alternative test of planarity may be used that measures triangle overlap area rather than a count of edge intersections.

Figure 5:
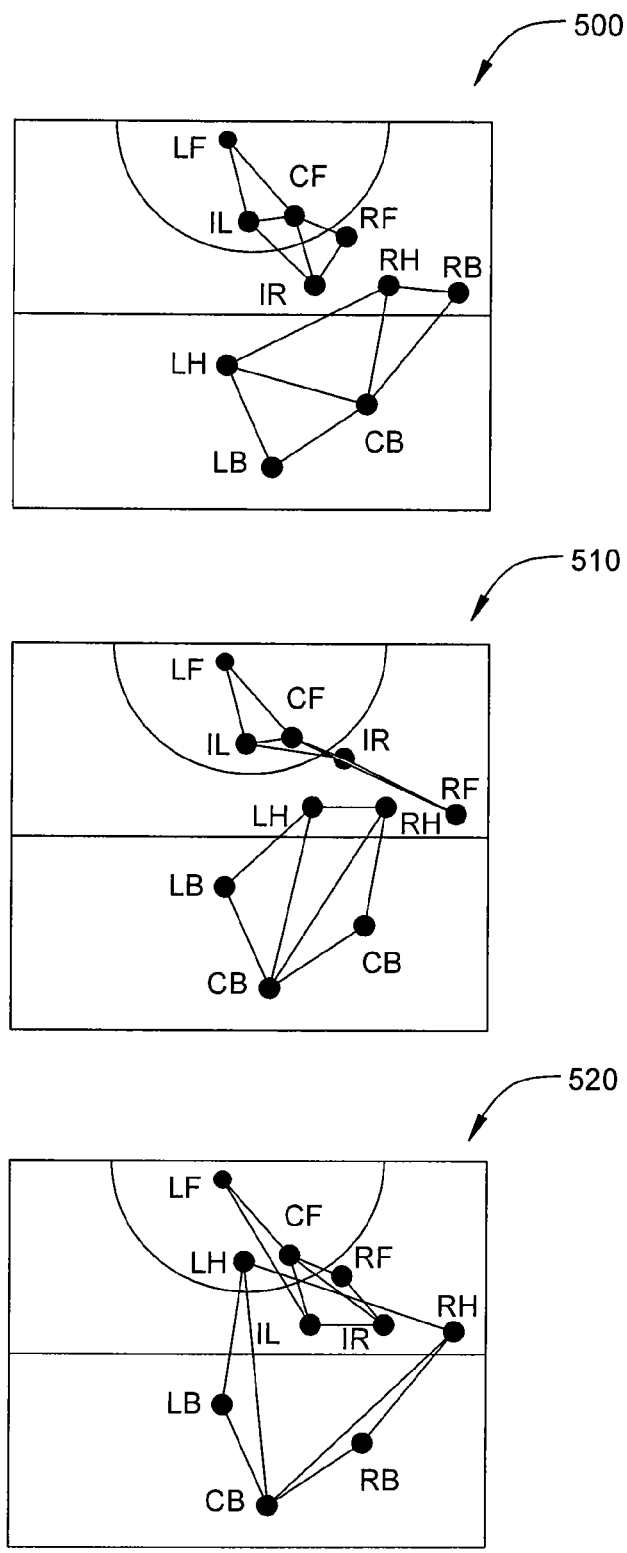
FIG. 5 illustrates a set of formations with varying levels of area overlap, according to one embodiment of the present invention.

FIG. 5 illustrates a set of formations with varying levels of area overlap, according to one embodiment of the present invention. As shown, the set of formations includes a formation with no overlap 500, a formation with small overlap 510, and a formation with large overlap 520.

The formation with no overlap 500 illustrates an assignment of roles that results in a triangulation with no triangle overlap. If none of the triangles overlap, then the graph of the formation is said to be planar.

However, if roles are incorrectly assigned, or if players get slightly out of position, two or more triangles may overlap. While the quantity of edge intersections is an integer value, the area of overlap among all triangles is a continuous measure. The formation with small overlap 510 may result from cases where a player is slightly out of position. The formation with large overlap 520, by contrast, may result from a highly unlikely role assignment that does not preserve the expected spatial relationship among roles. The energy function of the neighborhood context is given by Equation 20 below:

$$E^{nbr}(r_t, \mathcal{D}_t) = \lambda^{nbr} \sum_{(a,b) \in \Delta} \|\Delta_a \cap \Delta_b\| \quad \text{Equation 20}$$

where $\Delta_a$ and $\Delta_b$ represent a pair of triangles in the formation $\mathcal{F}$.

The energy functions of absolute and relative context result in linear assignment problems, which may be efficiently solved using Hungarian algorithm, as described herein. The neighborhood context evaluates simultaneous role assignments for groups of six players, in that each triangle in the formation $\mathcal{F}$ is defined by three vertices, where each vertex is a role. As such, computing the overlap of two triangles involves six simultaneous role assignments. The Hungarian algorithm is unable to such problems, and is therefore not suitable for computing neighborhood context costs.

Typically only a relatively small quantity of the N! possible permutations are feasible, where a feasible permutation represents an elastic deformation of $\mathcal{F}$ exhibiting little or no triangle overlap. As such, a "best assignments" approach may be employed to identify a likely subset of permutations by only considering absolute and relative context, as shown in Equation 21 below:

$$\{\hat{r}_t^1, \hat{r}_t^2, \ldots \{\hat{r}_t^k\} = \operatorname*{argmin}_{r_t}^k E^{abs}(r_t, \mathcal{D}_t) + E^{rel}(r_t, \mathcal{D}_t) \quad \text{Equation 21}$$

Then, the subset of feasible role assignments $\{\hat{r}_t\}$ is enumerated, and the neighborhood context is computed for the feasible role assignments to determine a more optimal role assignment.

In another alternative approach, the assignment analysis system may assign only labels or identities without assigning roles. The probability of a particular assignment $l_t$ of labels at time t may be given by $E_t(l_t, \mathcal{D}_t)$. If the observed data contains no appearance information, then the energy function is a constant, and the assignment of labels is, in effect, random. As such, the label ordering for the first frame may be defined as the original ordering of the player detections $L_0 \overset{\text{def}}{=} 1$. However, because players have mass, the movements of human players are governed by inertia, such that a label can only move so far from one detection frame to the next. Accordingly, a permutation $T_{t,T}$ may be inferred that preserves the arbitrary label ordering $l_t$ established at time=t to a consistent label assignment $l_T$ for a later time T>t, as given by equations 22 and 23 below:

$$T_{t,T} \tilde{l}_T = \tilde{l}_T \quad \text{Equation 22}$$

$$T_{t,T} = L_t L_T^{-1} \quad \text{Equation 23}$$

indicating that the labels, or identities, of players do not change during from time t to a later time T>t, such that a permutation matrix exists that restores the original identity ordering of the players.

Typically, $T_{t,T}$ is estimated by determining how well observations at time T fit hypothesized motion models generated from previous detections. The motions of players are assumed to be independent. That is, the trajectory of one player is not influenced by the trajectory of another player. At relatively high detection frame sampling rates, the player detections may be sufficiently fast to infer that the displacement of a player between two adjacent detection frames is near zero, as expressed in Equation 24 below:

$$E_t(l_t, l_{t-1}, \mathcal{D}) = \sum_i \|\mathcal{D}_t(\tilde{l}_t(i)) - \mathcal{D}_{t-1}(\tilde{l}_{t-1}(i))\|^2 \qquad \text{Equation 24}$$

As described above, the detections can be sorted by label/identity or role. As such, there is a permutation $Q_t$ may be defined that rearranges the labels/identities into role order, as given by Equation 25 below:

$$Q_t \stackrel{\text{def}}{=} R_t L_t^{-1} \qquad \text{Equation 25}$$

During the course of the game, players may swap roles by crossing paths with each other. As such, a matrix $S_{t,T}$ may be defined that encodes the role swaps that occur in the time period from time t to time T>t, as given by Equations 26 below:

$$S_{t,T} Q_T = Q_t \therefore S_{t,T} = Q_t Q_T^{-1} \qquad \text{Equation 26}$$

Role swapping between players is relatively infrequent, such that players tend to keep the same role from one detection frame to the next detection frame. As a result, the matrix $S_{t,T}$ may be substantially the same as the identity matrix I, such that $S_{t,T} \approx I$. Accordingly, most of the off-diagonal elements of $S_{t,T}$ are likely to be zero. Even so, the off-diagonal elements of $S_{t,T}$ may exhibit structure, in that certain groupings of roles are more likely to swap than others. For example, in field hockey, the left forward and right forward could frequently swap roles to create confusion for the defense. Similarly, the backs and mid-fielders could swap roles laterally as well, although likely to a lesser degree. In addition, some players could also tend to swap in forwards-backwards directions, such as a left mid-fielder swapping roles with a left back. On the other hand, it would be relatively unlikely for a left forward to swap with a right defender.

As expressed in Equations 22 and 26, the assignments of both labels and roles have temporal relations to the respective previous assignments of labels and roles. Because role swapping is temporally sparse, $S_{t,T}$ has an expected structure. By contrast, the tracking matrix $T_{t,T}$ does not have an equivalent prior because the permutation matrices $L_t$ and $R_t$ implicitly incorporate the arbitrary detection order under which the (x, y) detections were observed at time t. Given the probability of a particular $S_{t,T}$ an equivalent expectations may be placed on $Q_T$ that effectively correlates the assignments of labels $l_T$ and roles $r_T$. Equation 22 and Equation 25 may be substituted into Equation 26 to estimate $S_{t,T}$ from role assignments and tracking, as shown in Equation 27 below:

$$S_{t,T} R_T = R_T L_t^{-1} L_T$$

$$S_{t,T} R_T = R_t L_t^{-1} L_T$$

$$S_{t,T} R_T = R_t L_t^{-1} (L_t T_{t,T}^{-1})$$

$$S_{t,T} = R_t T_{t,T}^{-1} R_T^{-1} \qquad \text{Equation 27}$$

Equation 27 may be used to evaluate the difference between the current role assignments $r_T$ and the role assignments achieved by propagating the previous role assignments $r_t$ forward using the tracking results. Note that the final term in the energy function shown in Equation 16 evaluates the same property, namely, the likelihood of transitioning from a previous simultaneous assignment $(l_{t-1}, r_{t-1})$ of labels and roles to a new simultaneous assignment $(l_t, r_t)$. As such, the cost for a particular role swapping $\tilde{s}_{t-1,t} \in \mathcal{S}_n$ determined by $(l_{t-1}, r_{t-1}, l_t, r_t)$ may be computed from the appropriate elements of the empirical model $\hat{S}_{t-1,t}$, as given by Equation 28 below:

$$E_t(l_t, r_t, l_{t-1}, r_{t-1}, \mathcal{D}_t) = -\sum_i \log \hat{S}_{t-1,t}(i, \tilde{s}_{t-1,t}(i)) \qquad \text{Equation 28}$$

where $\tilde{s}_{t-1,t}$ is the cost of swapping a role between t−1 and t, and $\hat{S}_{t-1,t}$ is the model that defines the cost of swapping a role between t−1 and t.

In some cases, resolving the isolated labels and roles assignment optimizations may produce multiple ambiguous solutions. In addition, when the likelihood of role swapping is considered, the optimal simultaneous assignments of labels and roles involving two non-optimal isolated assignment solutions. Because the potential solution space of Y is large, and the majority of simultaneous role and label/identity permutations are unlikely, the top k permutations from the solution space for isolated tracking assignment $T_T = \{T_T^1, T_T^2, \ldots, T_T^k\}$ and role assignment $R_T = \{R_T^1, R_T^2, \ldots, R_T^k\}$, where the top k permutations have a higher likelihood of providing the optimal assignment. A minimum energy configuration $y_t^*$ may then be determined for each time instant by evaluating Equation 28 over all k×k proposed solutions. This approach may be extended to multiple frames by mapping the problem onto a trellis graph 600, as further described herein.

Figure 6:
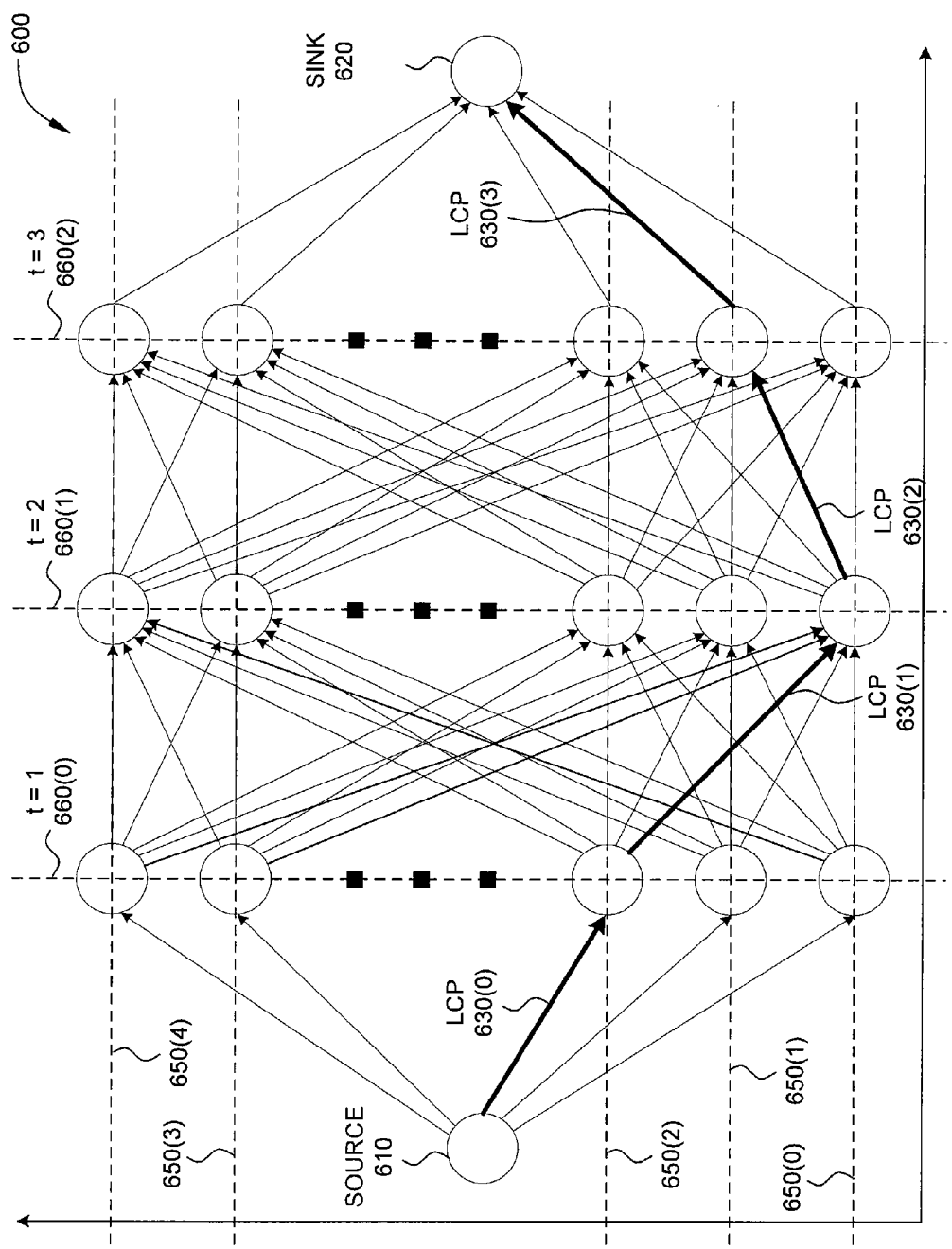
FIG. 6 illustrates a trellis graph that represents role optimization for multiple detection frames, according to one embodiment of the present invention.

FIG. 6 illustrates a trellis graph 600 that represents role optimization for multiple detection frames, according to one embodiment of the present invention. As shown, the trellis graph includes a source node 610 and a sink node 620. As also shown, the trellis graph includes intermediate nodes arranged in a grid, where the vertical dimension represents a potential assignment 650 and the horizontal position represents a detection time 660. The nodes are connected via directed edges, such as lowest cost path (LCP) edges 630.

For clarity, only a subset of potential assignments and detection times are shown. The source 610 represents a beginning role and label assignment for the team members. Each column represents a different detection time. Detection time 660(0) represents a detection time of t=1. Detection time 660(1) represents a detection time of t=2. Detection time 660(2) represents a detection time of t=3. The sink 620 represents an ending role and label assignment for the team members.

At each detection time 660, the trellis graph 600 includes a column of nodes, where each node represents a vertex that is a potential simultaneous assignment of roles and labels. If the quantity of potential role assignments has been narrowed to k best permutations, and the quantity of potential label assignments has also been narrowed to k best permutations, then the trellis graph 600 includes up to k×k vertices, or potential role and label assignments, at each detection time 660. As shown, permutation 650(0) is the first potential permutation, permutation 650(1) is the first potential permutation, and permutation 650(2) is the first potential permutation. Permutation 650(3) is the ((k×k)−1)$^{th}$ potential permutation, and permutation 650(4) is the (k×k)$^{th}$ potential permutation. Each directed edge, such as lowest cost permutation (LCP) edges 630, represent a cost of transition from a previous assignment at time=t−1, to a current assignment at time=t. The least cost path from the source 610 to the sink 620, as represented by the LCP edges 630(0), 630(1), 630(2), 630(3), indicate the optimal sequence of label and roll assignments as play progresses.

A vertex at position v in a column of the trellis graph 600 at time t represents a particular set of role and label assignments as defined by equation 29 below:

$$V_t^v = (l_t, r_t)_v \qquad \text{Equation 28}$$

A directed edge from a vertex in position u at time t−1 to a vertex in position v at time t, has a weight as given by Equation 29 below:

$$w^{u \to v} = E(r_t, \mathcal{D}_t) + E(l_{t-1}, l_t, \mathcal{D}_t) + E(l_{t-1}, r_{t-1}, l_t, r_t, \mathcal{D}_t) \quad \text{Equation 28}$$

Accordingly, edges emanating from the source 610 have a weight of $E(r_1)$, while edges leading directly to the sink 620 have a weight of zero. The least cost path (LCP) 630, as measured by the sum of edge weights from the source 610 to the sink 620, determines the optimal sequence y* of role and label assignments that minimizes the function as shown in Equation 15.

Figure 7:
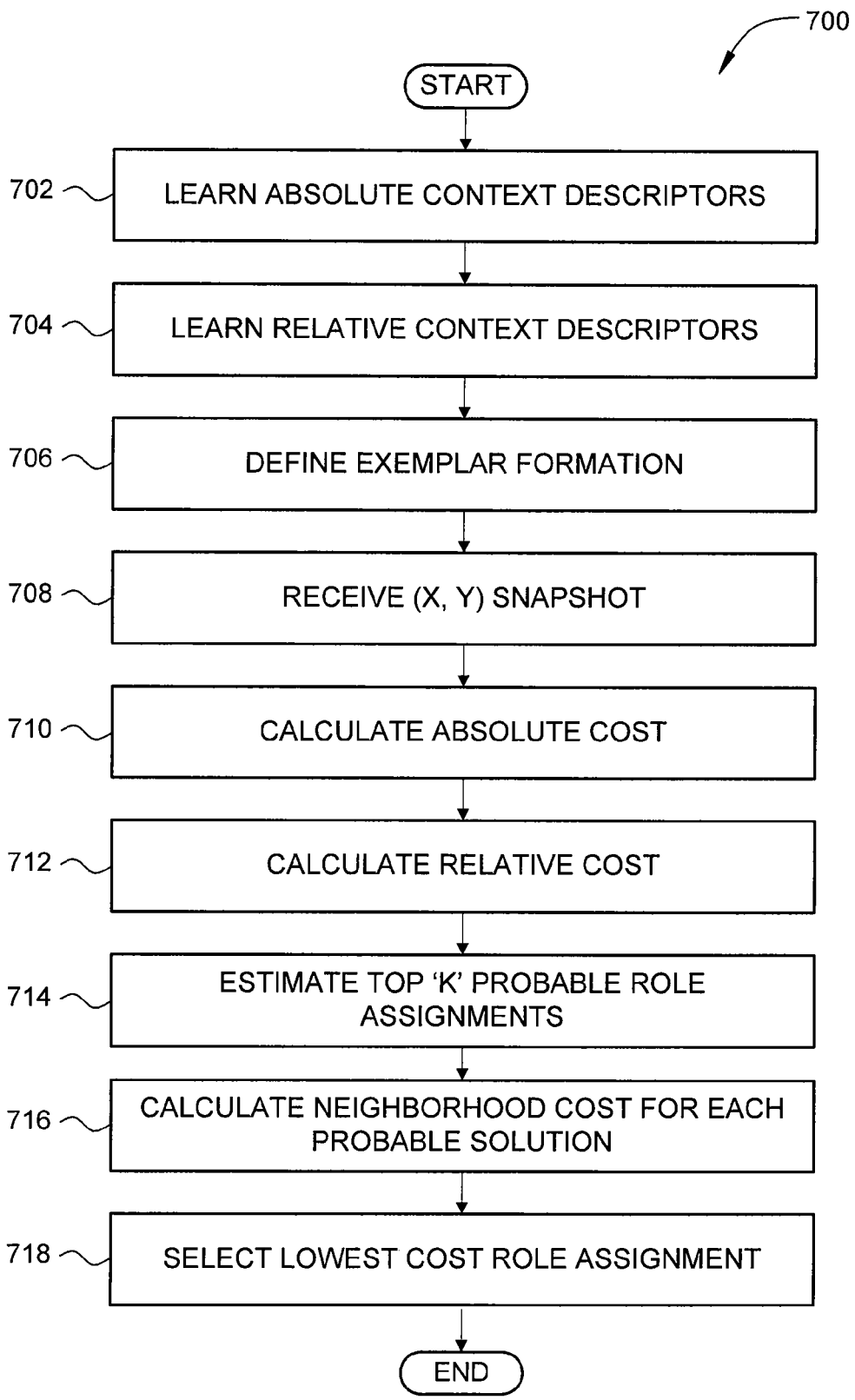
FIG. 7 sets forth a flow diagram of method steps for assigning players to detection information, according to one embodiment of the present invention.

FIG. 7 sets forth a flow diagram of method steps for assigning players to detection information, according to one embodiment of the present invention. Although the method steps are described in conjunction with the systems of FIGS. 1-6, persons of ordinary skill in the art will understand that any system configured to perform the method steps, in any order, is within the scope of the invention.

As shown, a method 700 begins at step 702, where the assignment analysis system learns absolute context descriptors. In one embodiment, the absolute context descriptors may include manually-labeled position data from prior games. At step 704, the assignment analysis system learns relative context descriptors. In one embodiment, the relative context descriptors may also include manually-labeled position data from prior games. At step 706, the assignment analysis system defines at least one exemplar formation. At step 708, the assignment analysis system receives a snapshot that includes (x, y) positions for a set of players. At step 710, the assignment analysis system calculates absolute cost data associated with the player positions, based on the absolute context descriptors. At step 712, the assignment analysis system calculates relative cost data associated with the player positions, based on the relative context descriptors. At step 714, the assignment analysis system estimates the top k probable role assignments based on the absolute cost data and the relative cost data. At step 716, the assignment analysis system calculates a neighborhood cost for each probable solution. At step 718, the assignment analysis system selects the role assignment associated with the lowest cost. The method 700 then terminates.

Figure 8A:
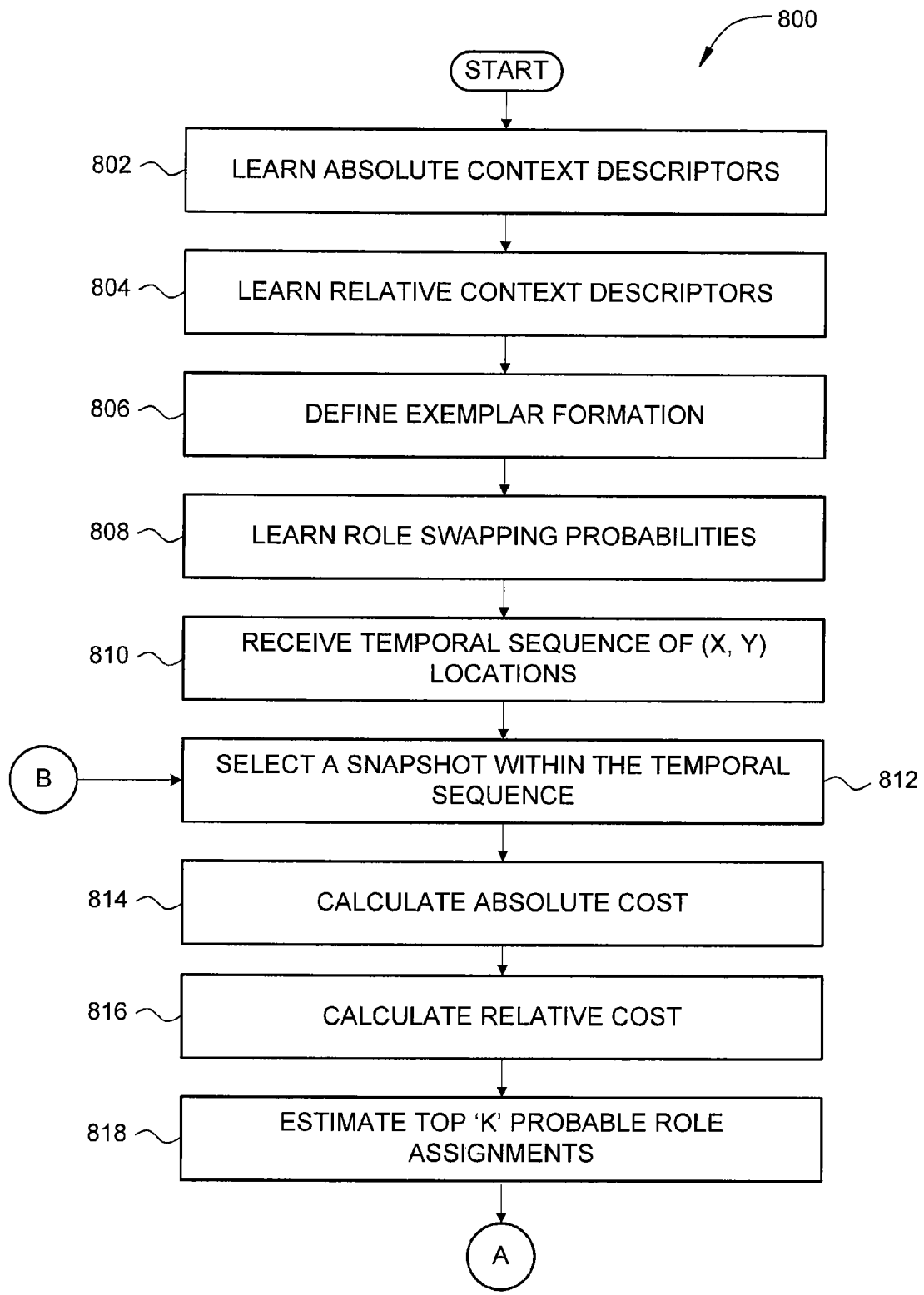
FIGS. 8A-8B set forth a flow diagram of method steps for assigning players to detection information, according to another embodiment of the present invention.
Figure 8B:
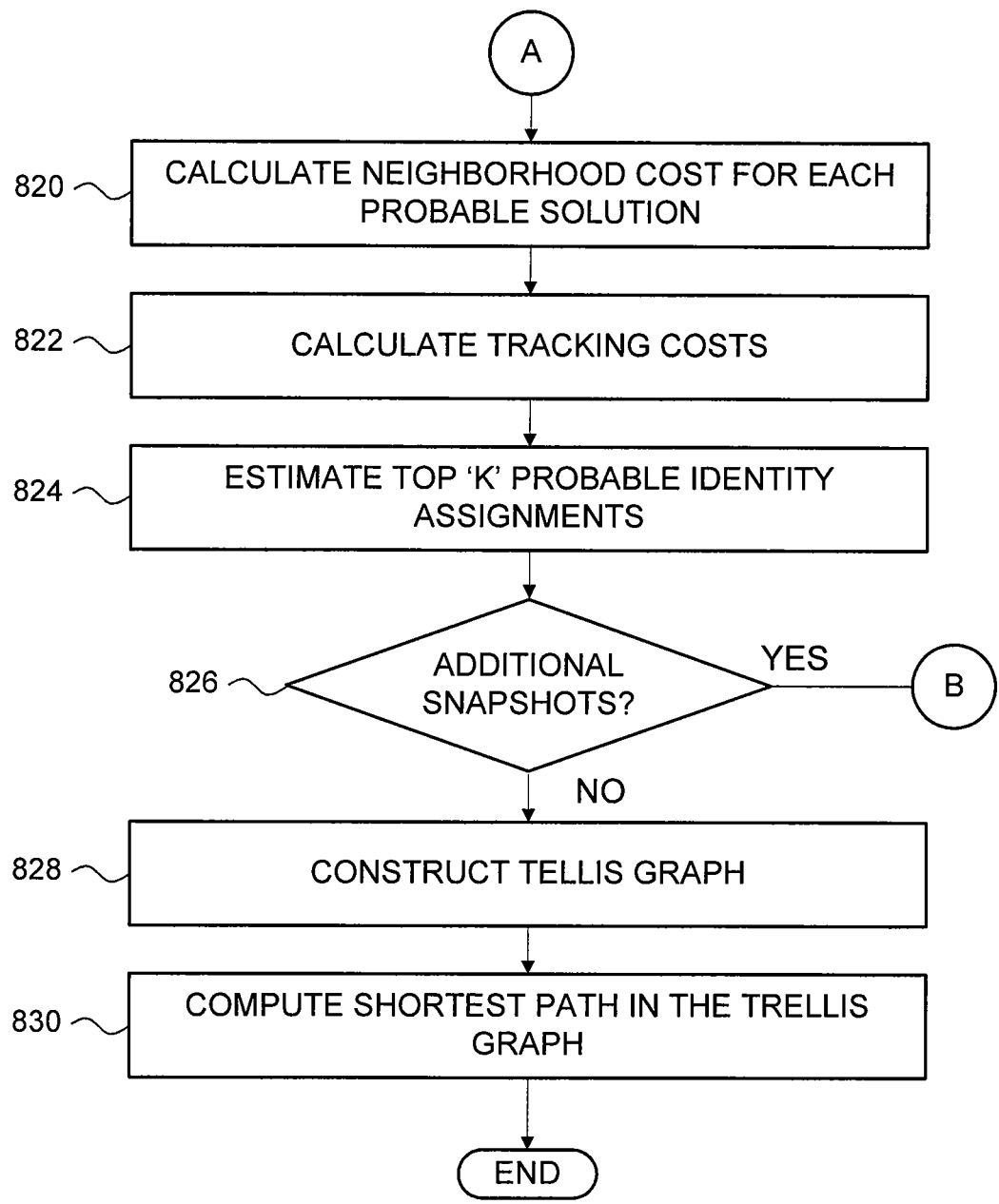

FIGS. 8A-8B set forth a flow diagram of method steps for assigning players to detection information, according to another embodiment of the present invention. Although the method steps are described in conjunction with the systems of FIGS. 1-6, persons of ordinary skill in the art will understand that any system configured to perform the method steps, in any workable order, is within the scope of the invention.

As shown, a method 800 begins at step 802, where the assignment analysis system learns absolute context descriptors. At step 804, the assignment analysis system learns relative context descriptors. In one embodiment, the absolute context descriptors, the relative context descriptors, or both the absolute context descriptors and the relative context descriptors may include manually-labeled position data based on prior games. The absolute context descriptors may be in the same data set relative context descriptors. Alternatively, the absolute context descriptors may be in the same data set relative context descriptors. At step 806, the assignment analysis system defines at least one exemplar formation. At step 808, the assignment analysis system learns role swapping probabilities. In one embodiment, the role swapping probabilities may include manually entered data.

At step 810, the assignment analysis system receives a temporal sequence of snapshots that includes (x, y) positions for a set of players at each of a sequential set of time steps. At step 812, the assignment analysis system selects a snapshot within the temporal sequence. At step 814, the assignment analysis system calculates absolute cost data associated with the player positions, based on the absolute context descriptors. At step 816, the assignment analysis system calculates relative cost data associated with the player positions, based on the relative context descriptors. At step 818, the assignment analysis system estimates the top k probable role assignments based on the absolute cost data and the relative cost data. At step 820, the assignment analysis system calculates a neighborhood cost for each probable solution.

At step 822, the assignment analysis system calculates tracking costs. At step 824, the assignment analysis system estimates the top k probable identity assignments based on the tracking cost data. At step 826, the assignment analysis system determines whether there are additional snapshots to process. If there are additional snapshots to process, then the method proceeds to step 812, described above.

If, however, at step 826, there are no additional snapshots to process, then the method proceeds to step 828, where the assignment analysis system constructs a trellis graph that includes the top k probable role assignments and the top k probable identity assignments. As step 830, the assignment analysis system computes the shortest path in the trellis graph. The method 800 then terminates.

The techniques described herein may be used in various applications to support live analysis or post-analysis of sporting events or other events involving teams exhibiting role-based behavior. Such applications include, without limitation, measuring specific team behavior, retrieving plays similar to a reference play, or measuring the frequency of a given play of interest.

In a first example, a pattern of role-swaps could be used to measure specific or unique team behavior under a given set of circumstances, such as open versus pressured shots toward the goal. The quantity of role-swaps could be different during an open shot, such as when no or few defenders are nearby, versus a pressured shot, where multiple defenders are nearby. Role-swap patterns could be analyzed to determine if a given play is indicative of an open shot or a pressured shot. Role-swap patterns could be compared between a current game versus one or more previous games as a technique to identify a team based on role-swap behavior or to determine whether the role-swap patterns during a current game are consistent with or different from the team's role-swap behavior during prior games.

In a second example, processed tracking data from a current play could be used to retrieve similar plays from one or more prior games. The retrieval of prior plays could be based on an input query to a to a database management system, where the input query includes the processed tracking data of the current play of interest, and one or more input features of the current play, where an input feature represents a characteristic of the play. The database management system would retrieve prior plays that are consistent with or similar to the processed tracking data of the current play and that exhibit correspondence to the input features. Such input features could include, without limitation, the role-swap behavior of the players, the travel speed of the ball, or the distance between players. The distance measure could be based on technically feasible distance metric, including, without limitation, Euclidean distance ($L_2$ norm) or maximum distance ($L_\infty$ norm). This approach could enable automated, online retrieval of similar plays during a live sporting event, such as could be desired to support game analysis. Such an approach could yield more accurate and timely retrieval results versus retrieval based on manually annotated plays based on keywords, such as "three point shot" or "half court shot."

In a third example, multiple plays could be grouped into a cluster, where each play in the cluster exhibits similar role-swapping behavior. A particular play of interest could be specified, where the play of interest would be identified based on a threshold, such as a minimum distance between a first player role and a second player role. Others plays that are similar to the play of interest could be grouped into a cluster, based on the threshold. The number of plays in the cluster would indicate how often the play of interest occurs in a current game or in one or more previous games. Dividing the number of plays in the cluster by the total number of plays in a game would yield the percentage occurrence of the play of interest.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for assigning roles to agents in a first group of agents engaging in an activity, comprising:
   receiving a first set of detections, wherein each detection in the first set of detections comprises a physical location;
   defining an exemplar formation comprising an arrangement of each role in a set of roles;
   calculating a first cost function between at least one detection in the first set of detections and at least one role in the set of roles;
   generating a first set of permutations based on the first cost function; and
   assigning a first role in the set of roles to a first detection in the first set of detections based on the first set of permutations.

2. The method of claim 1, further comprising separating the first set of detections into a first portion comprising physical locations associated with the first group of agents and a second portion comprising physical locations associated with a second group of agents.

3. The method of claim 1, wherein each physical location in the first set of physical locations comprises an absolute location in a playing field configured for a team sport.

4. The method of claim 1, wherein each physical location in the first set of physical locations comprises a position of a first agent in the first group of agents relative to a second agent in the first group of agents.

5. The method of claim 1, wherein assigning a first role in the set of roles to a first detection in the first set of detections comprises:
   selecting a set of potential permutations for evaluation, wherein each permutation defines a relationship between each detection in the set of detections and each role on the set of roles;
   for each time step in a set of time steps, calculating a transition cost to transition from a first permutation at a first time step to a second permutation at a second time step;
   selecting a lowest cost path through the set of time steps based on the transition costs; and
   assigning the first role in the set of roles to the first detection in the first set of detections based on the lowest cost path.

6. The method of claim 1, wherein assigning a first role in the set of roles to a first detection in the first set of detections comprises:
   selecting a set of potential permutations for evaluation, wherein each permutation defines a relationship between each detection in the set of detections and each role on the set of roles;
   for each time step in a set of time steps, calculating a transition cost to transition from a first permutation at a first time step to a second permutation at a second time step;
   selecting a lowest cost path through the set of time steps based on the transition costs;
   determining that the lowest cost path is temporally inconsistent with a current assignment of roles in the set of roles to detections in a second set of detections;
   selecting a next lowest cost path through the set of time steps based on the transition costs; and
   assigning the first role in the set of roles to the first detection in the first set of detections based on the next lowest cost path.

7. The method of claim 1, further comprising:
   calculating a second cost function between at least one detection in the first set of detections and at least one agent in the first group of agents;
   generating a second set of permutations based on the second cost function; and
   assigning a first identity associated with a first agent in the first group of agents to a first detection in the first set of detections based on the second set of permutations.

8. The method of claim 7, further comprising:
   receiving a second set of detections, wherein each detection in the second set of detections comprises a physical location;
   calculating a third cost function between at least one detection in the second set of detections and at least one role in the set of roles;
   generating a third set of permutations based on the third cost function;
   calculating a fourth cost function between at least one detection in the second set of detections and at least one agent in the first group of agents; and
   generating a fourth set of permutations based on the fourth cost function;
   wherein assigning the first role to the first detection is further based on at least one of the second set of permutations, the third set of permutations, and the fourth set of permutations, and wherein assigning the first identity to the first detection is further based on at least one of the first set of permutations, the third set of permutations, and the fourth set of permutations.

9. The method of claim 1, further comprising:
- determining that a first quantity of detections in the first set of detections is less than a second quantity of roles in the set of roles; and
- selecting a second role in the set of roles that lacks a corresponding detection in the first set of detections based on the first cost function.

10. The method of claim 1, further comprising:
- determining that a first quantity of detections in the first set of detections is greater than a second quantity of roles in the set of roles; and
- selecting a second detection in the first set of detections that lacks a corresponding role in the set of roles based on the first cost function.

11. The method of claim 1, wherein the exemplar formation is selected by a user from a predefined set of exemplar formations.

12. The method of claim 1, further comprising characterizing a behavior of the first group of agents based at least in part on the assignment of the first role to the first detection, wherein the behavior is defined by a plurality of sets of detections including the first set of detections.

13. The method of claim 1, further comprising:
- retrieving a first sequence of detections based at least in part on the assignment of the first role to the first detection, wherein the first sequence of detections comprises a plurality of sets of detections including the first set of detections, each set of detections corresponding to a different time;
- retrieving an input feature representing a characteristic of the first sequence of detections;
- identifying a second sequence of detections included in a database of detection data based on the input feature; and
- retrieving the second sequence of detections from the database.

14. A non-transitory computer-readable storage medium including instructions that, when executed by a processor, cause the processor to assign roles to agents in a first group of one or more agents engaging in an activity, by performing an operation comprising:
- receiving a first set of detections, wherein each detection in the first set of detections comprises a physical location;
- defining an exemplar formation comprising an arrangement of each role in a set of roles;
- calculating a first cost function between at least one detection in the first set of detections and at least one role in the set of roles;
- generating a first set of permutations based on the first cost function; and
- assigning a first role in the set of roles to a first detection in the first set of detections based on the first set of permutations.

15. The non-transitory computer-readable storage medium of claim 14, further comprising separating the first set of detections into a first portion comprising physical locations associated with the first group of agents and a second portion comprising physical locations associated with a second group of agents.

16. The non-transitory computer-readable storage medium of claim 14, wherein each physical location in the first set of physical locations comprises an absolute location in a playing field configured for a team sport.

17. The non-transitory computer-readable storage medium of claim 14, wherein each physical location in the first set of physical locations comprises a position of a first agent in the first group of agents relative to a second agent in the first group of agents.

18. The non-transitory computer-readable storage medium of claim 14, wherein assigning a first role in the set of roles to a first detection in the first set of detections comprises:
- selecting a set of potential permutations for evaluation, wherein each permutation defines a relationship between each detection in the set of detections and each role on the set of roles;
- for each time step in a set of time steps, calculating a transition cost to transition from a first permutation at a first time step to a second permutation at a second time step;
- selecting a lowest cost path through the set of time steps based on the transition costs; and
- assigning the first role in the set of roles to the first detection in the first set of detections based on the lowest cost path.

19. The non-transitory computer-readable storage medium of claim 14, wherein assigning a first role in the set of roles to a first detection in the first set of detections comprises:
- selecting a set of potential permutations for evaluation, wherein each permutation defines a relationship between each detection in the set of detections and each role on the set of roles;
- for each time step in a set of time steps, calculating a transition cost to transition from a first permutation at a first time step to a second permutation at a second time step;
- selecting a lowest cost path through the set of time steps based on the transition costs;
- determining that the lowest cost path is temporally inconsistent with a current assignment of roles in the set of roles to detections in a second set of detections;
- selecting a next lowest cost path through the set of time steps based on the transition costs; and
- assigning the first role in the set of roles to the first detection in the first set of detections based on the next lowest cost path.

20. A computing system, comprising:
- a memory that is configured to store instructions for a program; and
- a processor that is configured to execute the instructions for the program to assign roles to agents in a first group of one or more agents engaging in an activity, by performing an operation comprising:
  - receiving a first set of detections, wherein each detection in the first set of detections comprises a physical location;
  - defining an exemplar formation comprising an arrangement of each role in a set of roles;
  - calculating a first cost function between at least one detection in the first set of detections and at least one role in the set of roles;
  - generating a first set of permutations based on the first cost function; and
  - assigning a first role in the set of roles to a first detection in the first set of detections based on the first set of permutations.

* * * * *